United States Patent [19]
Hagen

[11] 3,922,109
[45] Nov. 25, 1975

[54] ROTOR FOR FLOW MACHINES
[75] Inventor: Hermann Hagen, Dachau, Germany
[73] Assignee: Motoren- und Turbinen-Union Munchen GmbH, Germany
[22] Filed: Aug. 29, 1973
[21] Appl. No.: 392,818

[30] Foreign Application Priority Data
Aug. 29, 1972 Germany............................ 2242448

[52] U.S. Cl................................. 416/213; 416/219
[51] Int. Cl.² ............................................. F01D 5/30
[58] Field of Search ............ 415/214, 219; 416/213, 416/241, 220, 244 A, 221; 29/156.8 B

[56] References Cited
UNITED STATES PATENTS

| | | | |
|---|---|---|---|
| 2,429,215 | 10/1947 | Boestad ............................. | 416/219 |
| 2,657,008 | 10/1953 | Atkinson......................... | 416/213 X |
| 2,922,619 | 1/1960 | Slemmons...................... | 416/244 A |
| 3,045,968 | 7/1962 | Willis.............................. | 416/219 X |
| 3,246,389 | 4/1966 | Pfau................................ | 29/200 |
| 3,317,988 | 5/1967 | Endres........................... | 29/156.8 |
| 3,590,454 | 7/1971 | Brass.............................. | 29/158.8 B |
| 3,689,176 | 9/1972 | Howell et al..................... | 416/96 |
| 3,749,514 | 7/1973 | Kelch et al..................... | 416/95 |
| 3,756,745 | 9/1973 | Alver et al...................... | 416/230 |
| 3,784,320 | 1/1974 | Rossmann et al.............. | 416/219 X |

FOREIGN PATENTS OR APPLICATIONS

| | | | |
|---|---|---|---|
| 718,939 | 3/1942 | Germany............................. | 416/219 |
| 879,345 | 6/1953 | Germany............................. | 416/241 |
| 1,426,849 | 4/1969 | Germany............................. | 416/213 |
| 1,953,711 | 4/1970 | Germany............................. | 416/193 |
| 809,268 | 2/1959 | United Kingdom................. | 416/193 |

Primary Examiner—Everette A. Powell, Jr.
Attorney, Agent, or Firm—Craig & Antonelli

[57] ABSTRACT

A rotor wheel for flow machines, method of making same, and fixture for holding same during manufacture, wherein a rotor disk of a relatively deformable material is connected by brazing with a plurality of rotor blades seated in respective slots in a rotor disk. The slots and blade root portions are configured so as to exhibit different angled dove-tailed slot portions radially spaced from one another to as to accommodate uneven temperature distribution through the rotor disk. Intermediate the airfoil portion and root portion of the blades, widening portions are provided which abut adjacent widening portions to form an annulus for a cooling medium between the rotor disk and the blades. Recesses are formed in the dovetail slots for accommodating the brazing alloy adjacent lateral facing sides of the blade roots and rotor disk slot such that, upon heating of the rotor disk, the alloy can flow from the recesses to the gap between the blade and slot. The method of manufacture includes heating the assembled disk and blades and then rapidly rotating same so as to effect a centrifugal flow of the brazing material to the desired locations, with a further later cooling of the assembly during the rotation. The holding fixture includes a pair of sealing disks which clamp opposite sides of the rotor disk and are rotatable with the rotor disk during the brazing operation. The fixture also includes a hoop which engages with the widening portions of the blades to hold them in position during the manufacturing operation.

13 Claims, 2 Drawing Figures

ROTOR FOR FLOW MACHINES

BACKGROUND AND SUMMARY OF THE INVENTION

This invention relates to a rotor wheel for flow machines consisting of a rotor disk of a ductile material and of rotor blades of a highly heat-resistant material which are seated in contoured slots provided in said rotor disk. In current small gas turbine work use is essentially made of two main methods of manufacturing rotor wheels: casting in the solid and fabricating from individual parts.

Casting in one piece results in an economical manufacture. However, the turbine wheels must be cast of blade material, which is a highly heat-resistant but rather brittle and nonductile material. At the rapidly changing temperature conditions commonly encountered in use with vehicular gas turbines, the stresses occurring in the root zone of the blade will differ in severity as a result of differences in temperature from the center of the rotor wheel to its rim. In extended service, therefore, hairline cracks will result between the blades. These hairline cracks do not usually cause an individual blade to tear loose but will, in many instances, cause the entire rotor disk to tear apart or burst to pieces.

When an individual blade tears off in operation, fragments will not normally pierce the turbine walls housing the rotor wheel whereas a bursting disk poses an immediate risk to the environment of the turbine in that larger fragments carry much weight and, therefore, substantially more momentum. In current practice the countermeasure has been to envelope the rotor wheel radially with an armored liner to contain the fragments.

These above-discussed disadvantages are avoided in a fabricated rotor wheel. While the blades are in fact made of said highly heat-resistant material, the rotor disk itself is made of a ductile malleable material which admits of elastic deformation. This elastic deformation capability enables the material to sustain without injury such thermal stresses as would destroy the above-described more brittle cast rotor. The disadvantage associated with fabricated rotors is that the disk must have very closely toleranced means for seating the blades and that the blade roots to fit these seats must be contoured with equally close tolerances. Since the highly heat-resistant material is exceedingly difficult to machine, high manufacturing costs result due to the tolerances required at both the disk and blade roots.

Welded rotors have also been contemplated, but these are very susceptible to failure at the welded seats for the blades.

The present invention contemplates providing a rotor arrangement which poses no exacting requirements in terms of accurate manufacture but still prevents the rotor from bursting apart or individual blades from tearing off.

The present invention further contemplates providing a rotor in which the blades are brazed or welded in contoured slots and have a collar-type widening portion between the airfoil portion and the root of each blade, where the widening portions of the various blades form a closed hoop which in turn, together with the wheel disk, forms an annulus intersected by the blade roots.

Welded or brazed joints between blade and disk for producing a unitary rotor which has a ductile disk and highly heat-resistant blades have been contemplated. However, the present invention contemplates a particularly shaped blade which enables a lasting welded joint to be achieved by virtue of its collar-type widening portion by which it rests against the adjacent blade and prevents flexural vibrations in the welded area. A blade formed in accordance with the present invention more particularly and advantageously admits of a brazed joint in that it shields the blade root from the hot gases. It is a further advantage with the arrangement of the present invention that this brazed joint allows very liberal tolerances, because the voids then existing can all be filled with braze alloy. Should excessive stresses be induced during brazing, tempering can be used to recrystallize the braze alloy such that the entire rotor wheel will be virtually free from stresses in its joints.

In a further aspect, the present invention contemplates providing that the blade root exhibits two or more lateral faces which are arranged in pairs one above or radially outward of the other and incline towards each other to engage with one or more suitably contoured dovetail slots arranged one below or radially inward of the other in the rotor disk. This shape of slot, although it will not have to extend as deep as for a fir-tree or hammer-head root, was previously to the present invention ruled out for blades which were an interference fit in the disk, for when the centrifugal force acted on a higher or more radially outward point of the blade, the wedge-shaped blade root was liable to expand the dovetail slot.

In a further aspect, this invention contemplates providing that the bottom of (radially inner end with respect to rotor wheel axis of rotation) of each dovetail slot exhibits a depression between the disk and blade root. As a result, only narrow lands remain to support the blade from below (in the radial outward direction). Then, in the event the blade root is too heavily scored by machining or too malformed in casting to fit the slot, it can be forced into position as the narrow lands will then give way. Those surfaces of the slot that are under centrifugal force from the blades will then not have to be injured when the blades are forced into place. These depressions can also be made to accommodate solid or liquid braze alloy.

In a further aspect, the present invention contemplates providing that the lateral faces of blade root and associated slot are joined together by brazing, where the braze area is designed for pressure and for shear. In this manner the braze alloy and the shape of the blade root can be attuned one to the other. The angle included by the two sides of the blade root will be very narrow, for instance, when the braze alloy may essentially be loaded only by shear, and it will be relatively wide when the braze alloy resists severe pressure. Thus, the design of the specific configuration of the sides of the blade root can be optimized according to the invention by selecting the appropriate angle included by the two sides in accordance with the expected in use loading of the blade and blade root.

Since the braze alloy will vary in strength with temperature, this invention provides for a different angle of flank for each of the vertically or radially spaced dovetail slots. This makes it possible to consider the radial spread of temperature through the disk by selecting a flank angle to suit the prevailing temperature and the associated characteristic properties of the braze alloy. That is, not only does the invention provide for blade root side angles for optimizing in use loading due to rotation and aerodynamic loading at the blades but also for side angles accommodating the radial temperature gradient through the rotor disk at each blade root.

In a further aspect of the present invention the bottom or radially inward end of the dovetail slot (including the plurality of interconnected dovetail slots) exhibits a bow-shaped or oval cross-sectional shaped recess with a smaller dimension in the radial direction than in the circumferential direction which will not be covered or filled by the blade root. This oval recess eliminates notching stresses and thus radial cracks in the bottom or radially inward end of the overall slot or in the areas of contact of the blade root with the bottom.

In a further aspect, this invention contemplates providing that a cooling medium, more particularly air, flows through the annulus confined by the widening blade portions and the disk and, in further preferred embodiments, enters cavities and cooling ducts provided in the blades. This cooling medium arrangement prevents the brazed blade roots from heating excessively; and it will further be possible to exploit the heat drawn from the blade roots for some specific purpose, such as heating the interior of the vehicle, or to return it to the gas turbine cycle by mixing the heated air with the air from the heat exchanger and then directing it to the combustion chamber.

The present invention further contemplates providing a method of assembling a rotor wheel arranged in accordance with this invention, where braze alloy, more particularly in the shape of wire or stripping, is inserted in the depressions, whereafter the blades are seated and the disk is brought to brazing temperature. In a further aspect of this invention, the hot rotor wheel is then spun at a sufficiently rapid speed to urge the liquid braze alloy under centrifugal force into the gaps between the disk and the blade and fill these, where the annulus can be provided with some filler material, such as sand, to prevent the exit of liquid braze alloy. The so-assembled rotor is cooled at continued rotation and the braze alloy solidifies in the gaps it occupies. Liquid braze material is prevented from issuing at the sides by means of a fixture designed to accommodate a rotor assembled in accordance with the present invention, where the disk is appropriately located and clamped and caused to rotate. This fixture uses a sealing disk on either side of the rotor disk, and they grip the rotor disk between them to prevent the exit of liquid braze alloy or filler sand from the spinning rotor. According to preferred embodiments of the invention, the two sealing disks are heated to provide some or preferably all the heat needed for the brazing operation.

In a further apsect of the present invention said fixture is provided with a rotating hoop which extends concentrically with the clamped disk and allows the collar-type widening portions of the blade to rest with their outer surfaces against its inner surface. When the blades are seated in the slots, liberal manufacturing tolerances on blade root and slot dimensions cause the blades to assume random positions. But when the rotor is spun, the resultant forces urge the blades to contact said rotating hoop with their collar-shaped widening portions, where all blades will then have the same center distance and the same radial direction regardless of any gaps that may or may not exist between any one blade and the disk. The gaps are filled with braze alloy and after the rotor has cooled down, the blades will retain their position. In this manner a rotor can be manufactured at maximally liberal tolerances without detracting from the conformity to contour of the rotor when finished.

These and other objects, features and advantages of the present invention will become more obvious from the following description when taken in connection with the accompanying drawings, which show, for purposes of illustration only, several embodiments in accordance with the present invention.

DETAILED DESCRIPTION OF THE DRAWINGS

Figure 1:
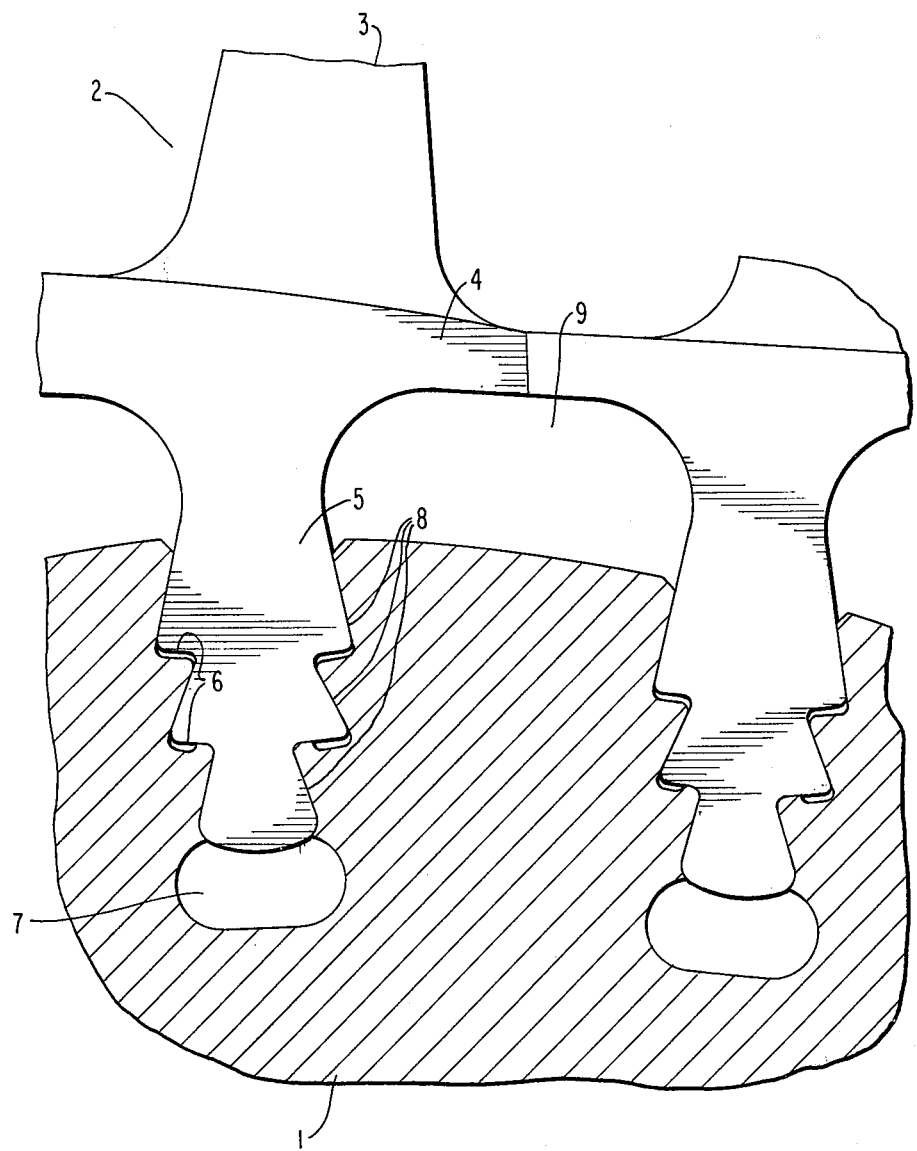
FIG. 1 is a partial cross-sectional view taken in the axial direction of a rotor disk and showing the arrangement of blade roots attached to the disk in accordance with the present invention.

Referring to the drawings, disk 1 of a ductile malleable material has slots in which blades 2 are brazed. The blades 2 each consist of an airfoil portion 3, a blade root 5, and a collar-type widening portion 4. The collar-type widening portions 4 of two adjacent blades abuttingly contact one with the other. The collar-type widening portion 4 facing the airfoil 3 has a step which provides a circular-cylindrical surface for seating the blade in the brazing fixture. The ring formed by the collar-type widening portions, together with the disk 1, confines an annulus 9. Each overall slot consists of three vertically or radially spaced dovetail slots each having a different angle of flank at respective faces 8. The bottom of the overall slot has a bow-shaped or oval shaped recess 7, and the bottoms of the two upper dovetail slots have depressions 6 which serve to accommodate the braze insert. The upper edges of the slot are chamfered to prevent the blade root 5 from being notched. The blade is brazed to the disk 1 at the slanted face 8 on either side.

Following are exemplary dimensions of various features of a rotor constructed in accordance with the present invention, it being noted that these dimensions are given by way of example only and not by way of limitation:

| | |
|---|---|
| diameter of the ring formed by the collar-type widening portions 4 | 140 mm |
| length of a blade | 40 mm |
| length of a blade root | 15 mm |
| diameter of disk 1 | 125 mm |
| altitude of recess 7 | 25 mm |
| altitude of depressions 6 | 0,3 mm |

Figure 2:
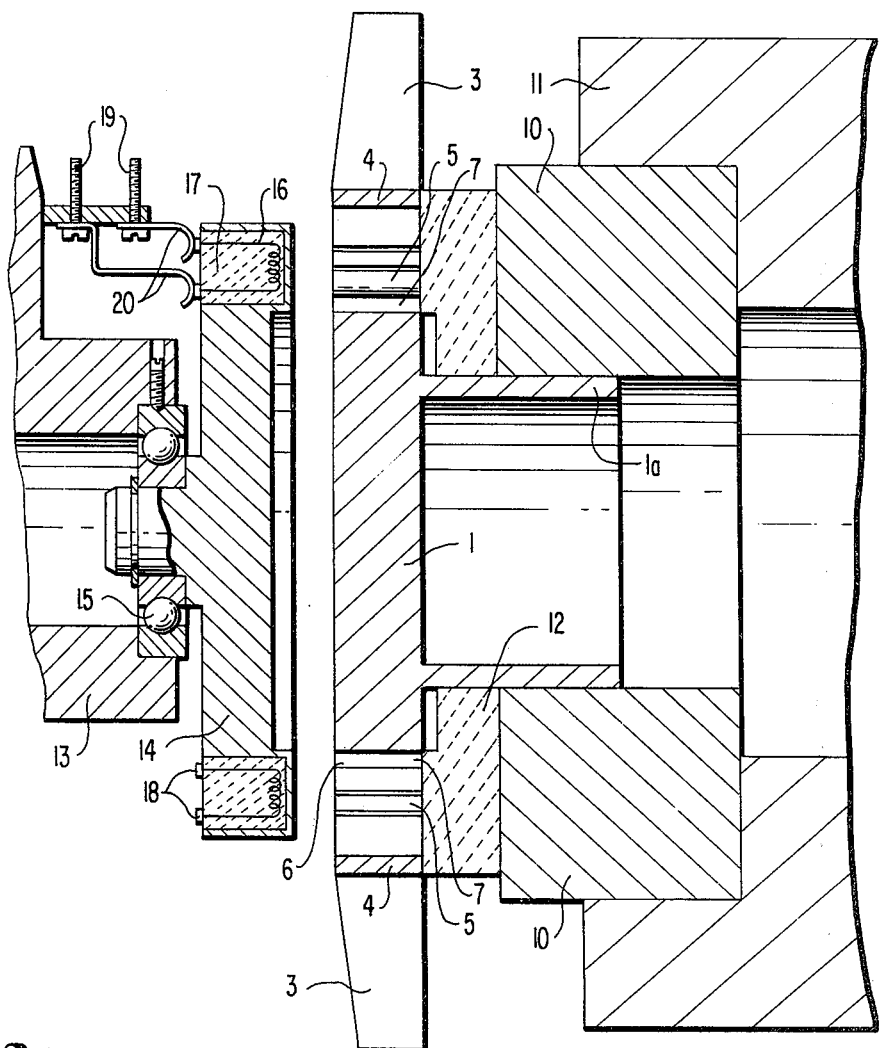
FIG. 2 is a schematic part-sectional view taken at right angles to the rotor disk axis and showing a fixture for aiding in assembling blades on a rotor disk in accordance with the present invention.

FIG. 2 illustrates a fixture constructed in accordance with the present invention for facilitating the assembly of the rotor blades on the rotor disk. The disk 1 is furnished with a socket 1a and a ceramic separating ring 12 is arranged around the socket between teeth 10 of a mandrel 11 which clampingly engages the periphery of the socket 1a. The mandrel 11 is attached to a lathe (not shown) which imparts rotational forces during certain portions of the assembling steps. It is noted that the ring 12 is fixedly axially clamped in position so as to present a firm relatively axially fixed back-up member for holding the blade root portions in position during the brazing and spinning operations. Once the disk 1 is clamped in position, the blades 3 are attached and the depressions 6 and 7 filled with thin-shaped soldering material. The slide 13 is then pushed against the clamped disk 1 until the heating disk 14 presses against disk 1 and blade roots 5. Ball bearing 15 accommodates rotational movement of the heating disk 14 with respect to the slide 13.

In the hollow peripheral zone of the heating ring 14, electric heating wires 16 are inserted which are fixed by ceramic material 17. On the rear or left side of the heating ring 14, two contact rings 18 are provided which are connected with the heating wires 16. Electric power is delivered to the pins 19 through contact springs 20 and the contact rings 18 to the heating wires.

Following is a specific example of the materials and certain of the method steps in accordance with the present invention, which example is included to facilitate the disclosure of the invention and not by way of limitation. The material used for the disk may be steel with a content of not more than 20 percent of chromium and/or nickel. The material for the blades can be an alloy of approximately 60 percent nickel with copper, manganese or chromium. The soldering material contains nickel (more than 60 percent), boron and silicon. With the disk and blades clamped in position and the soldering material in the depressions 6 and recesses 7 and with the heating disk 14 clamped against the disk assembly, the disk is heated until it reaches a melting temperature of the soldering material (for example, approximately 1000°C), and rotation of the disk by way of the mandrel 11 is initiated. Although the invention could be utilized with assembly of the blades spinning up to 40,000 rpm (the approximate rotational rate of the disk assembly in use in a turbine), the speed will depend on the lathe used and a speed of 5000 rpm has proven sufficient. With a rotational speed of 5000 rpm, such rotation is maintained for approximately 30 minutes with the heated disk. The heating apparatus is then switched off while continuing rotation of the disk until the brazing material is solidified.

While I have shown and described several embodiments in accordance with the present invention, it is understood that the same is not limited thereto but is susceptible of numerous changes and modifications as known to those skilled in the art and I therefore do not wish to be limited to the details shown and described herein but intend to cover all such changes and modifications as are encompassed by the scope of the appended claims.

I claim:
1. A rotor wheel for flow machines comprising:
   a rotor disk made of relatively deformable material and including a plurality of radially extending blade accepting dovetail slots,
   and a plurality of rotor blades fixedly seated in respective ones of said slots by weld means, said blades being made of a highly heat-resistant material different from the material of the rotor disk, each of said blades including an airfoil portion, a root portion and a collar-type widening portion between said root and airfoil portions,
   wherein the widening portions of adjacent blades abut one another to form a closed hoop around the circumference of and spaced from the rotor disk, said hoop and the outer circumference of the rotor disk forming an annulus which is intersected by parts of respective root portions of the blades,
   wherein said weld means is brazing material,
   wherein each of said blade root portions have a plurality of lateral faces which face away from the radius extending from the center of the disk through the center portion of the associated blade, said lateral faces being arranged in pairs with each lateral face of a pair arranged at the same radial distance from the center of the disk, each blade including at least two of said pairs of lateral faces spaced radially from one another, the lateral faces of a pair being inclined toward one another and being engageable with respective sidewalls of respective dovetail slot portions of the respective slot accommodating the respective blade,
   wherein the lateral faces of each pair are arranged at opposite sides of and inclined at a similar angle with respect to a disk radius through the respective blade, and
   wherein the angles of inclination for the lateral faces of one pair are different than for those of an adjacent radially spaced pair of lateral faces for the same respective blade, whereby the temperature gradient through the root portion of said blade can be accommodated by the respective different angular inclinations.

2. A rotor wheel according to claim 1, wherein at least some of said dovetail slot portions exhibit bottom walls facing substantially in the radial direction and intersecting a respective sidewall, and wherein depressions are formed between said bottom walls and associated radially facing walls of said root portions when portions of said radially facing walls and bottom walls are in abutting engagement.

3. A rotor wheel according to claim 2, wherein said sidewalls and lateral faces are brazed one to the other.

4. A rotor wheel according to claim 1, wherein respective oval cross-sectional shaped recesses, as seen in the direction of the rotor disk axis of rotation, are formed between the innermost radial ends of the respective root portions and slots.

5. A rotor wheel according to claim 2, wherein respective oval cross-sectional shaped recesses, as seen in the direction of the rotor disk axis of rotation, are formed between the innermost radial ends of the respective root portions and slots.

6. A rotor wheel according to claim 3, wherein respective oval cross-sectional shaped recesses, as seen in the direction of the rotor disk axis of rotation, are formed between the innermost radial ends of the respective root portions and slots.

7. A rotor wheel according to claim 1, wherein said annulus is configured such that a cooling medium can be introduced into said annulus for cooling said rotor wheel.

8. A rotor wheel according to claim 3, wherein said annulus is configured such that a cooling medium can be introduced into said annulus for cooling said rotor wheel.

9. A rotor wheel according to claim 2, wherein said annulus is configured such that a cooling medium can be introduced into said annulus for cooling said rotor wheel.

10. A rotor wheel according to claim 6, wherein said annulus is configured such that a cooling medium can be introduced into said annulus for cooling said rotor wheel.

11. A rotor wheel according to claim 1, wherein the lateral faces slope radially outwardly toward the radius.
pg,19

12. A rotor wheel for flow machines comprising:
a rotor disk made of relatively deformable material and including a plurality of radially extending blade accepting dovetail slots,
and a plurality of rotor blades fixedly seated in respective ones of said slots by weld means, said blades being made of a highly heat-resistant material different from the material of the rotor disk, each of said blades including an airfoil portion, a root portion and a collar-type widening portion between said root and airfoil portions,
wherein the widening portions of adjacent blades abut one another to form a closed hoop around the circumference of and spaced from the rotor disk, said hoop and the outer circumference of the rotor disk forming an annulus which is intersected by parts of respective root portions of the blades,
wherein said weld means is brazing material,
wherein each of said blade root portions have a plurality of lateral faces which face away from the radius extending from the center of the disk through the center portion of the associated blade, said lateral faces being arranged in pairs with each lateral face of a pair arranged at the same radial distance from the center of the disk, each blade including at least two of said pairs of lateral faces spaced radially from one another, the lateral faces of a pair being inclined toward one another and being engageable with respective sidewalls of respective dovetail slot portions of the respective slot accommodating the respective blade,
wherein at least some of said dovetail slot portions exhibit bottom walls facing substantially in the radial direction and intersecting a respective sidewall,
wherein depressions are formed between said bottom walls and associated radially facing walls of said root portions when portions of said radially facing walls and bottom walls are in abutting engagement, and
wherein said depressions are so configured that when portions of said radially facing walls and said bottom walls are in abutting engagement, only a narrow land of each bottom wall remains to support each blade such that the blade can be forcecd against the land in such a manner that the land will give way.

13. A rotor wheel according to claim 12, wherein the lateral faces of each pair are arranged at opposite sides of and inclined at a similar angle with respect to a disk radius through the respective blade, and wherein the angles of inclination for the lateral faces of one pair are different than for those of an adjacent radially spaced pair of lateral faces for the same respective blade, whereby the temperature gradient through the root portion of said blade can be accommodated by the respective different angular inclinations.

* * * * *